Patented Nov. 28, 1922.

1,436,949

UNITED STATES PATENT OFFICE.

FREDRIK W. DE JAHN, OF NEW YORK, N. Y., ASSIGNOR TO ATMOSPHERIC NITROGEN CORPORATION, OF NEW YORK, N. Y., A CORPORATION OF NEW YORK.

SYNTHETIC PRODUCTION OF AMMONIA.

No Drawing. Application filed July 23, 1920. Serial No. 398,464.

*To all whom it may concern:*

Be it known that I, FREDRIK W. DE JAHN, a citizen of Norway, and resident of the borough of Manhattan, city, county, and State of New York, have invented certain new and useful Improvements in the Synthetic Production of Ammonia, of which the following is a specification.

This invention relates to the art of suitably preparing nitrogen and hydrogen for the synthetic production of ammonia by means of a catalyst and the invention consists in passing the gases employed in this catalytic re-action over sodium amide (i. e. an amide of one of the alkali metals) before the gases are introduced to the catalyst.

The present application is a continuation in part of applicant's case Serial No. 200,047, filed November 3, 1917, for process for converting atmospheric nitrogen into a compound containing combined nitrogen.

In this art it is necessary to an extent more than in other arts, to make certain that before the hydrogen and nitrogen gases are subjected to catalytic action for conversion into ammonia, the nitrogen and hydrogen be as free as possible from concomitants which have an effect injurious to the catalysis, such, for example, as moisture. I have found that if the gas or gas mixture, after traversing drying agents such as soda lime and just prior to the catalytic action upon the mixture of nitrogen and hydrogen, be passed through material such as sodium amide, the gas or gases which are passed through sodium amide are then in a fit condition for subjection to the catalytic action.

Broadly considered, my invention thus consists in passing nitrogen and hydrogen and preferably a mixture thereof in the one to three relation, prior to the introduction of said gases into the catalytic re-action chamber, over and through an amide of one of the alkali metals and preferably sodium amide. The nitrogen and hydrogen gases in the general process in which I have employed the foregoing invention as fully described in the parent application of which this is a continuation in part, are under a pressure of approximately 1400 pounds, under which pressure they traverse the sodium amide and then enter the catalytic chamber. When the gases under such pressure are passed through sodium amide, no provision for controlling the temperatures is required.

I claim:

1. In a process for the synthetic production of ammonia from hydrogen and nitrogen the step which comprises passing either gas over an amide of one of the alkali metals prior to passing the mixture of gases through the catalyst converter.

2. In a process for the synthetic production of ammonia from hydrogen and nitrogen the step which comprises passing the mixture of gases over an alkali metal amide prior to the passage of the gases through the catalyst converter.

3. In a process for the synthetic production of ammonia from hydrogen and nitrogen the step which comprises passing either gas over sodium amide prior to the passage of the gases through the catalyst converter.

4. In a process for the synthetic production from hydrogen and nitrogen the step which comprises passing the mixture of gases over sodium amide prior to their passage through the catalyst converter.

In testimony whereof I have hereunto set my hand.

FREDRIK W. DE JAHN.